United States Patent
Ito et al.

(10) Patent No.: US 9,086,332 B2
(45) Date of Patent: Jul. 21, 2015

(54) METHOD FOR EVALUATING COLLISION PERFORMANCE OF VEHICLE MEMBER, AND MEMBER COLLISION TEST DEVICE USED FOR SAME

(75) Inventors: Yasunori Ito, Tokyo (JP); Kazuyuki Kawano, Tokyo (JP); Yasuharu Tanaka, Tokyo (JP); Hiroshi Yoshida, Tokyo (JP); Toshiyuki Kanda, Tokyo (JP); Satoshi Hirose, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 508 days.

(21) Appl. No.: 13/261,157

(22) PCT Filed: Aug. 4, 2010

(86) PCT No.: PCT/JP2010/063221
§ 371 (c)(1),
(2), (4) Date: Jan. 26, 2012

(87) PCT Pub. No.: WO2011/016499
PCT Pub. Date: Feb. 10, 2011

(65) Prior Publication Data
US 2012/0136640 A1 May 31, 2012

(30) Foreign Application Priority Data
Aug. 4, 2009 (JP) ................................. 2009-181208

(51) Int. Cl.
*G06G 7/48* (2006.01)
*G01M 7/08* (2006.01)
*G01M 17/007* (2006.01)

(52) U.S. Cl.
CPC ............ *G01M 7/08* (2013.01); *G01M 17/0078* (2013.01)

(58) Field of Classification Search
CPC .............. G01M 17/0078; G01M 7/08; G01M 17/0074; G01M 17/0072; G01M 17/02; G01L 5/282; G09B 9/058; G06F 17/5018; G06F 17/5095; B60C 19/00; B60C 99/006
See application file for complete search history.

(56) References Cited

U.S. PATENT DOCUMENTS 8,548,752 B2 * 10/2013 Matlschweiger ............... 702/41
2002/0134149 A1 * 9/2002 Shiraishi et al. ................ 73/146

(Continued)

FOREIGN PATENT DOCUMENTS

| CN | 2703686 | 6/2005 |
|---|---|---|
| CN | 101398342 | 4/2009 |

(Continued)

OTHER PUBLICATIONS

English Translation (Espacenet) of Japanese publication JP 2007304005 A(Yoshida et al.).*

(Continued)

*Primary Examiner* — Omar Fernandez Rivas
*Assistant Examiner* — Iftekhar Khan
(74) *Attorney, Agent, or Firm* — Kenyon & Kenyon LLP

(57) ABSTRACT

A performance evaluation method of a vehicle member includes a calculation process for performing an analysis using a partial structure CAE model modeling a module where a member of a vehicle to be evaluated and a collision test device for conducting a collision test on the member are combined, and obtaining a value of a collision performance evaluation parameter in the partial structure CAE model; a calculation process for determining a boundary condition of the partial structure CAE model; a calculation process for determining a test condition of a member collision test device based on the boundary condition of the partial structure CAE model; and a test process for conducting a collision test using a physical member collision test device and a physical member, based on the set condition of the member collision test device.

12 Claims, 6 Drawing Sheets

(56) References Cited

U.S. PATENT DOCUMENTS

| | | |
|---|---|---|
| 2005/0233285 A1 | 10/2005 | Miyamaru et al. |
| 2006/0130567 A1* | 6/2006 | Ben-David .................. 73/118.1 |
| 2008/0246308 A1* | 10/2008 | Uchida et al. ............ 296/187.03 |

FOREIGN PATENT DOCUMENTS

| | | | |
|---|---|---|---|
| DE | 102008030208 A1 | * | 12/2009 |
| EP | 2138822 A2 | * | 12/2009 |
| JP | 2005-134188 | | 5/2005 |
| JP | 2006-281964 | | 10/2006 |
| JP | 2006281964 A | * | 10/2006 |
| JP | 2007-527049 | | 9/2007 |
| JP | 2007-304005 | | 11/2007 |
| JP | 2007304005 A | * | 11/2007 |
| JP | 2008-185347 | | 8/2008 |
| WO | WO 2005/006220 | | 1/2005 |

OTHER PUBLICATIONS

English Translation (Espacenet) of Japanese publication JP 2006281964 A( Yammamoto et al.).*
English Translation (Espacenet) of EP publication EP 2138822 A2(Riedel et al.).*
English Translation (Espacenet) of German publication DE 102008030208 A1 (Theinert et al. ).*
Korean Office Action dated Apr. 23, 2013, issued in corresponding Korean Application No. 10-2012-7002925, and an English translation thereof.
Office Action dated Oct. 8, 2013 issued in corresponding Chinese Application No. 201080034291.6 [With English Translation].
Office Action dated Oct. 30, 2013 issued in corresponding Taiwanese Application No. 099126044 [With English Translation].
International Search Report dated Oct. 26, 2010 issued in corresponding PCT Application No. PCT/JP2010/063221.

\* cited by examiner

METHOD FOR EVALUATING COLLISION PERFORMANCE OF VEHICLE MEMBER, AND MEMBER COLLISION TEST DEVICE USED FOR SAME

TECHNICAL FIELD

The present invention relates to a collision performance evaluation method of a vehicle member performed in a vehicle development and design stage, and a member collision test device used for the same.

This application is a national stage application of International Application No. PCT/JP2010/063221, filed Aug. 4, 2010, which claims priority to Japanese Patent Application No. 2009-181208, filed Aug. 4, 2009, the content of which is incorporated herein by reference.

BACKGROUND ART

In the vehicle development and design stage, the evaluation of collision performance of a vehicle body is inevitable, and a vehicle maker builds a prototype vehicle and performs a collision test (collision experiment) to check that collision performance is ensured as desired and then proceeds to mass production. However, in a case where any member has insufficient strength, measures are taken to increase the strength of the member, and then a prototype vehicle needs to be build again to perform a collision test again. This process needs much development cost and time, which has a great influence on the development process.

In order to solve this problem, the collision performance testing of member units has been performed in the past. Basic members greatly influencing the collision performance of a vehicle have been already known in the art, and for example, in the case of side collision, a center pillar and a side sill are the most important members. If the performance evaluation of those members may be performed with the same conditions in a state where those members are mounted to an actual vehicle body (in a full vehicle state), the cost and time for manufacturing a prototype vehicle again may be saved.

However, in a case where 3-point bending test or the like is performed on each of those members separately, compared with the case a collision test is performed in a state where those members are mounted in an actual vehicle body, the support method of the member and the influence exerted by peripheral members may not be sufficiently reflected, and therefore the evaluation accuracy is too low to determine whether or not to adopt the member for an actual vehicle.

Meanwhile, a method of performing collision performance evaluation of vehicle members on a computer is widely used. For example, Patent Document 1 discloses a method of evaluating buckling characteristics of a center pillar during a collision by the dynamic explicit method using a computer aided engineering (CAE) model. The analysis using the CAE model in a full vehicle state is an effective collision performance evaluation method since the interaction between the member subject to the performance evaluation and other members may be accurately evaluated. However, the collision simulation in the full vehicle state is a very high load, and its execution needs a great deal of calculating ability and several days of calculating time. Therefore, it is difficult to perform the collision simulation a sufficient number of times. In addition, even if the calculating time is ensured, in the analysis using the CAE model, it is impossible to exactly reflect the work hardening occurring in a member fabricating process, thermal influence during welding, and a rupture phenomenon of a material. For this reason, to determine whether or not to adopt the member in an actual vehicle, the analysis using the CAE model even in a full vehicle analysis may not ensure sufficient reliability.

For those reasons, even though various technologies are being developed, it is still difficult to evaluate the collision performance of a vehicle member in an efficient and very accurate manner.

CITATION LIST

Patent Documents

[Patent Document 1] Japanese Unexamined Patent Application, First Publication No. 2006-281964

SUMMARY OF INVENTION

Problems to be Solved by the Invention

In consideration of the aforementioned problems, an object of the present invention is to provide a collision performance evaluation method of a vehicle member, which allows evaluation of the collision performance of a vehicle member with a reliability equivalent to a collision test in a full vehicle state using a prototype vehicle, and to provide a member collision test device used for the method.

Means for Solving the Problem

In order to solve the object, each aspect of the present invention provides as follows.

(1) A performance evaluation method of a vehicle member according to one aspect of the present invention includes: a calculation process (A) which performs an analysis using a partial structure computer aided engineering (CAE) model obtained by modeling a combined module of a member to be evaluated of a vehicle and a collision test device to conduct a collision test on the member, and which obtains a value of a collision performance evaluation parameter in the partial structure CAE model; a storing process (B) which stores the value of the collision performance evaluation parameter in the calculation process (A); a calculation process (C) which performs a comparison of the collision performance evaluation parameter in the partial structure CAE model with a collision performance evaluation parameter in a previously acquired full vehicle CAE model, and determines a boundary condition of the partial structure CAE model so that the difference in the comparison is in a predetermined range; a storing process (D) which stores the boundary condition of the partial structure CAE model obtained in the calculation process (C); a calculation process (E) which determines a boundary condition of a partial structure collision test device based on the boundary condition of the partial structure CAE model stored in the storing process (D); a storing process (F) which stores the boundary condition of the partial structure collision test device determined in the calculation process (E); and a test process (G) which conducts a collision test using a physical instance of the partial structure collision test device and a physical instance of the member, based on the boundary condition of the partial structure collision test device stored in the storing process (F).

(2) In the performance evaluation method of the aspect (1), the member to be evaluated may be selected using at least one of a analysis result using the full vehicle CAE model and a test result of a full vehicle collision test.

(3) In the performance evaluation method of the aspect (1) or (2), in the calculation process (A), the value of the collision performance evaluation parameter may be obtained by the partial structure CAE model with respect to a member having a shape different from the member to be evaluated, by using the boundary condition of the partial structure CAE model already stored in the storing process (D), and the shape of the member where the value of the collision performance evaluation parameter satisfies a predetermined condition may be determined, and for the member having the determined shape, a collision test using the partial structure collision test device may be performed based on the boundary condition stored in the storing process (F).

(4) In the performance evaluation method of any one of the aspects (1) to (3), the performance evaluation parameter of the partial structure CAE model obtained in the calculation process (A) may include at least one of a deformation mode, a deformation amount, a deformation velocity and a deformation energy.

(5) In the performance evaluation method of any one of aspects (1) to (4), the partial structure collision test device may support the member at a single support point or at a plurality of support points, and the boundary condition of the partial structure collision test device determined by the operation process (E) may include at least one of a degree of rotational freedom, a degree of translational freedom, a deformation resistance and a rotational deformation resistance at each support point of the partial structure.

(6) A collision tester according to one aspect of the present invention includes: a single or a plurality of support points which supports a physical member to be tested; a movable support portion which applies at least one of a degree of rotational freedom and a degree of translational freedom to the physical member; a resistance applying portion which applies at least one of a rotational deformation resistance and a translational deformation resistance to the physical member; and a load applying device pressing the physical member.

(7) In the collision test device of the aspect (6), the movable support portion may include a rotary shaft, and the resistance applying portion may include a flywheel connected to the rotary shaft.

(8) In the collision test device of the aspect (7), the rotary shaft may include a one-way clutch.

(9) In the performance evaluation method of any one of the aspects (1) to (5), in the test process (G), the collision test device according to any one of any one of the aspects (6) to (8) may be used.

Effects of Invention

In the collision performance evaluating method of the above aspect (1), the boundary condition of the partial structure CAE model is determined so that the difference between the collision performance evaluation parameter in the partial structure CAE model and the collision performance evaluation parameter in the full vehicle CAE model is in a predetermined range. By this process, even in the partial structure CAE model, as for the full vehicle CAE model, it is possible to precisely reflect the influence applied from peripheral members during a collision, and therefore the collision performance of the member may be efficiently evaluated with substantially the same accuracy as the analysis using the full vehicle CAE and the actual collision test in the full vehicle state, by the partial structure CAE model with a small calculation load. The collision test device of the aspect (6) includes a support point, a movable support portion, and a resistance applying portion, and therefore it may reproduce the influence applied to the member during a collision with good accuracy, and the test condition may be easily set. The collision test device may be used for the collision performance evaluation method of the aspect (1).

DESCRIPTION OF EMBODIMENTS

Hereinafter, a preferred embodiment of the present invention will be described. This embodiment may be implemented as a technical method for evaluating the performance of a vehicle member. Furthermore, each process of this embodiment may be implemented as a development system executed using a computer program and system.

Figure 1:
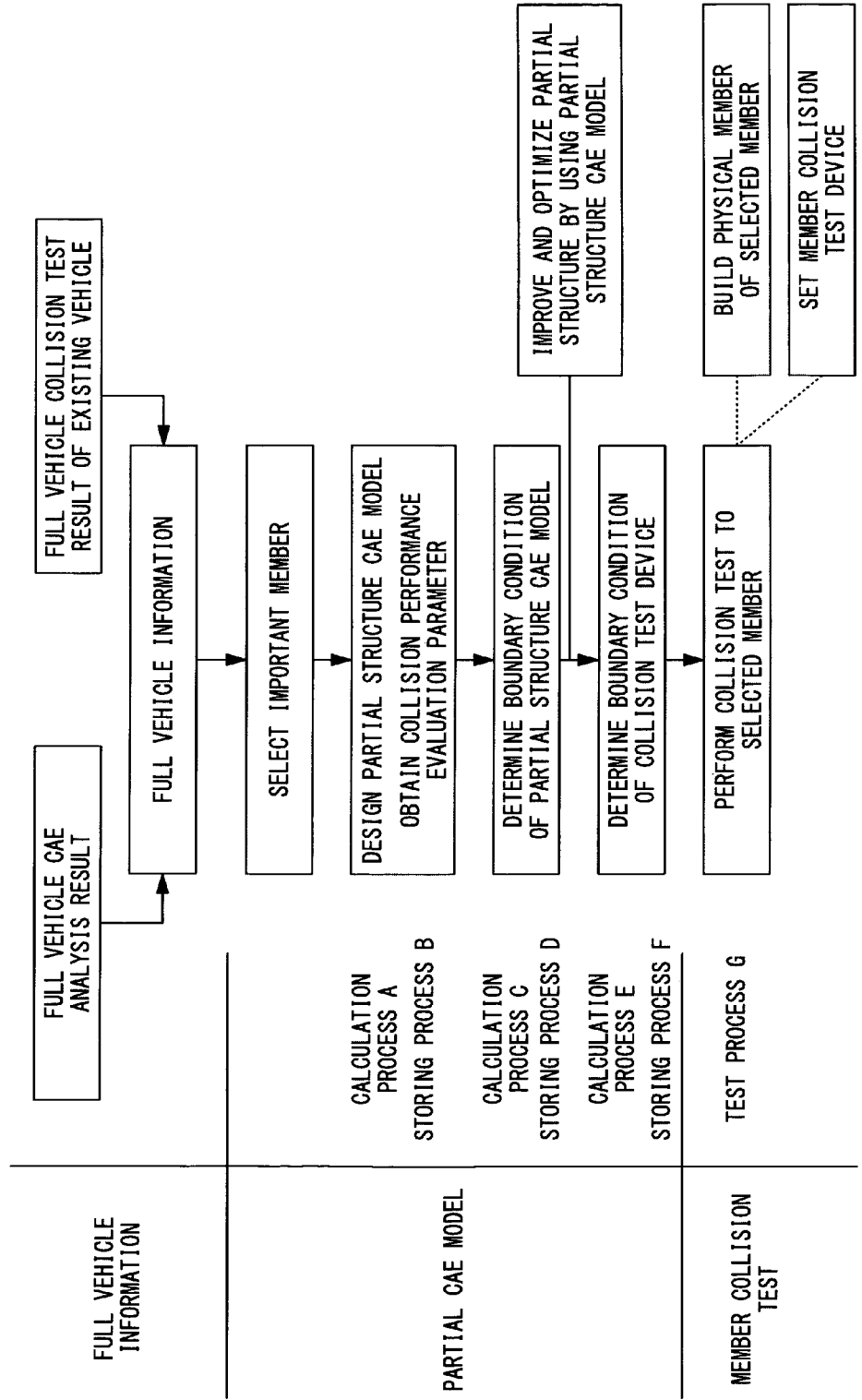
FIG. 1 is a flowchart illustrating a method according to an embodiment of the present invention.

FIG. 1 is a flowchart showing each process according to an embodiment of the present invention. Full vehicle information, such as full vehicle collision test results of currently existing vehicles, full vehicle CAE analysis results of a vehicle under development and design, or the like, is preserved in a database acquiring existing information or the like. In an information acquiring process, the system acquires the full vehicle information from the database. The database is not essential, and an engineer may suitably input necessary full vehicle information into the system. The full vehicle information includes information on deformation information (collision performance evaluation parameter) in the collision test. Based on the full vehicle information, among members (a single member or a group of a plurality of members) configuring a frame of a vehicle, members having a great influence on the collision performance (an important member) are selected.

Figure 2:
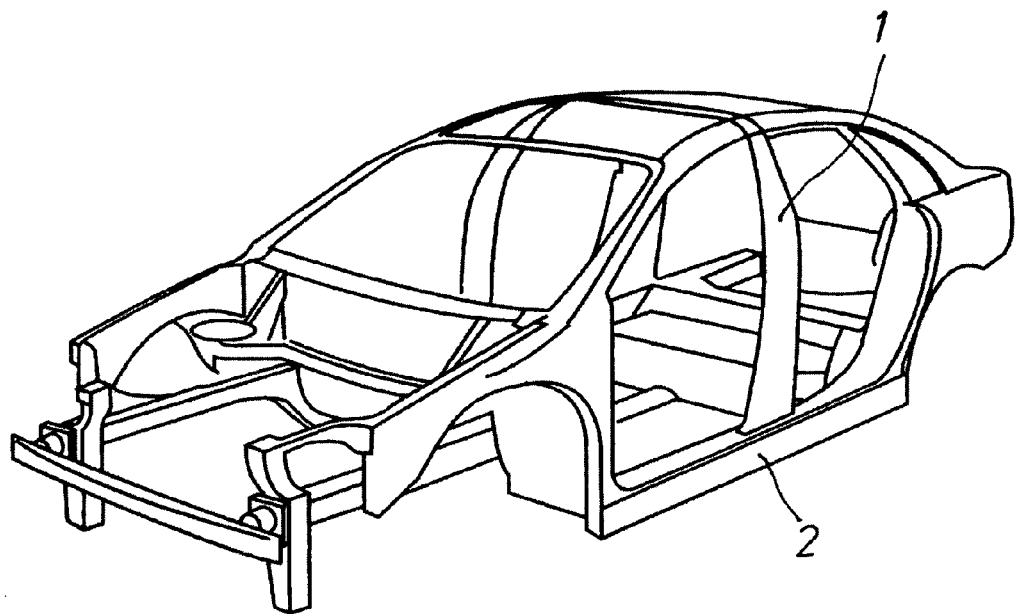
FIG. 2 is a perspective view of a structure of frame members of a vehicle.

The selected member will be a subject to analysis and collision performance evaluation according to the method of this embodiment. The member may be selected based on experiences or external information as desired by an engineer or may be automatically selected by the system. For example, regarding a plurality of frame members included in a vehicle, by using at least one of analysis results of a full vehicle CAE model and full vehicle collision test results, the level of contribution of each frame member on the deformation of the entire vehicle during the collision test may be calculated, and then members with the highest level of contribution may be selected (a member selecting process). For example, regarding the side collision, it is known that a center pillar 1 or a side sill 2 as shown in FIG. 2 has a great influence on the vehicle body, and such members may be selected based on this kind of knowledge. This embodiment will be described by choosing a composite body of the center pillar 1 and the side sill 2 as an example of the member to be tested.

In addition, in this specification, the member may be a single part from the viewpoint of processing units or material, or may be a composite body where a plurality of members are combined by welding, bonding or bolt fastening as in the above example. In addition, in the following description, the collision test in a state where the member is mounted to a vehicle (a full vehicle state) will be called a full vehicle collision test. In addition, the CAE simulation of the full vehicle collision test will be called a full vehicle collision simulation in the following description. On the other hand, the collision test performed in a state where only the aforementioned member is mounted to a collision test device (a member collision test device) will be called a member collision test in the following description. In addition, the CAE simulation of the member collision test will be called a partial structural collision simulation.

After a member to which the collision performance evaluation will be performed is selected, a module that is the combination of the member and a member collision test device which conducts a collision test of the member (for example, the composite body of the center pillar 1 and the side sill 2) is designed on the CAE (a partial structure CAE model design process). Hereafter, a procedure for an engineer to design a partial structure CAE model according to the embodiment will be described. In addition, the partial structure CAE model may also be automatically designed by a computer system based on previously input information and target parameters.

The partial structure CAE model is made by modeling a composite body of a member and a member collision test device that supports the member, according to the finite element method. A collision state of the member using the member collision test device may be simulated by the partial structure CAE model. As the information of the member used in the partial structure CAE model, in this stage, the data on shape and properties included in the existing full vehicle information accumulated in the above database is used.

In the partial structure CAE model, the structure of the member collision test device actually conducting the collision test on the member may be freely designed. A member collision test device corresponding to members of various shapes may be realized by using a basic frame described below, and mounting various exchangeable parts thereto. In a case where a collision test is conducted to a special member, the basic frame itself may be re-designed.

Figure 3:
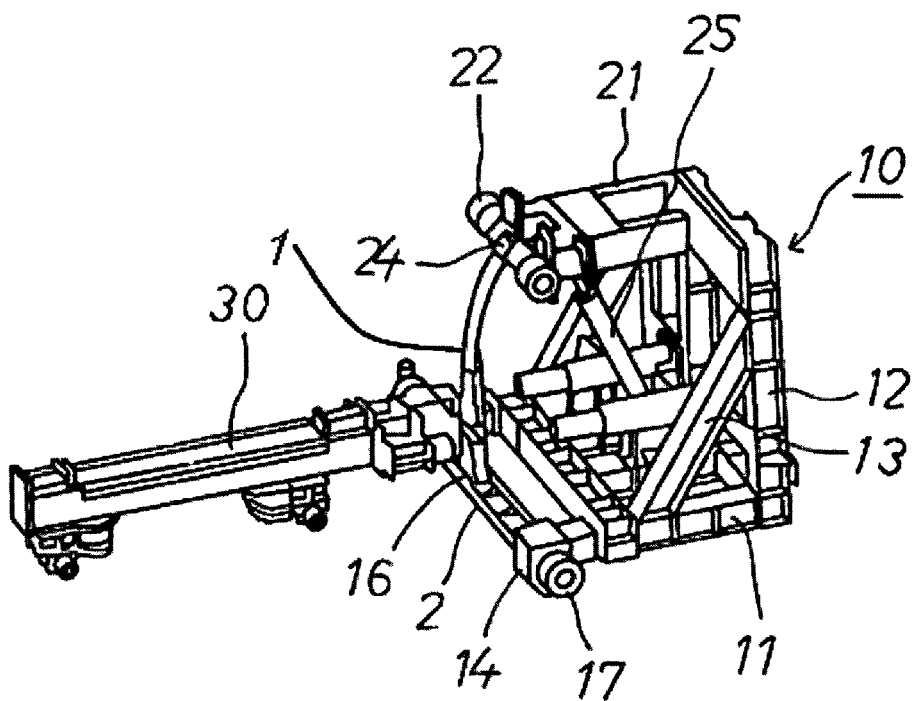
FIG. 3 is a perspective view of a member collision test device according to the embodiment.
Figure 4:
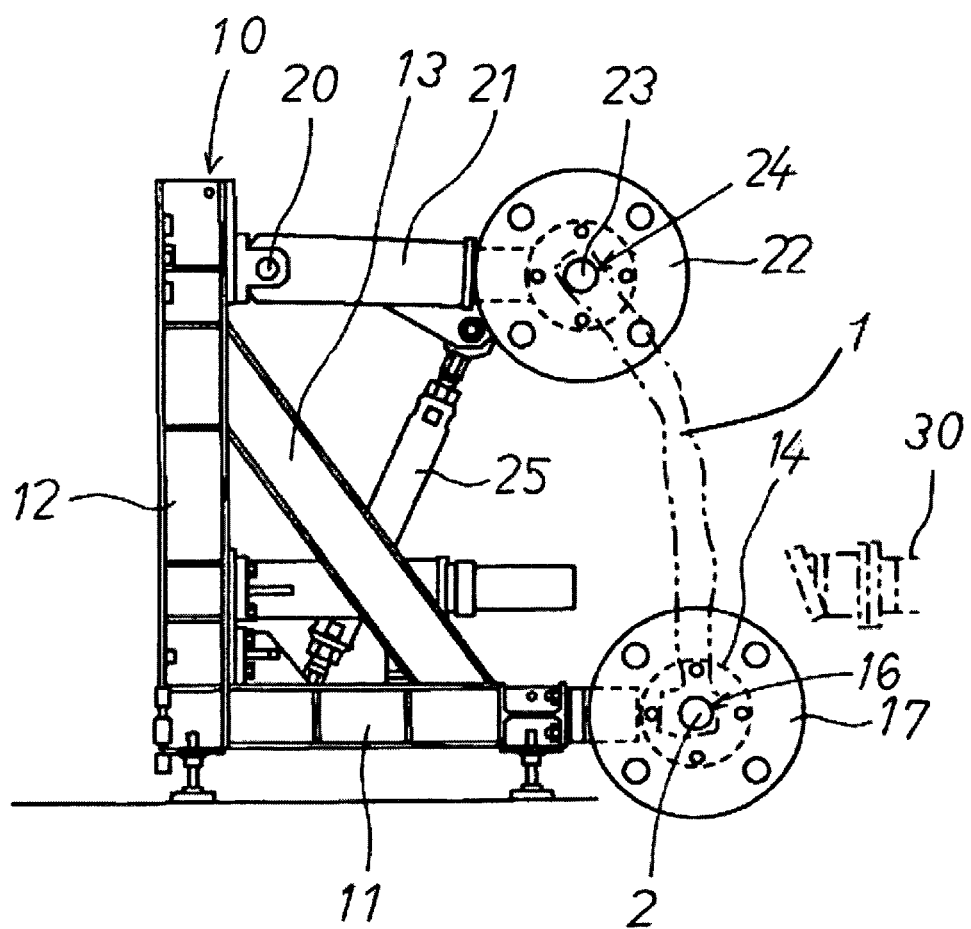
FIG. 4 is a side view of the member collision test device.

FIGS. 3 and 4 are diagrams illustrating the member collision test device according to this embodiment. The member collision test device includes, as a basic structure, a support jig 10 that supports the member, and a load applying device 30 that adds a load to the member. The detailed structures of the support jig 10 and the load applying device 30 of FIGS. 3 and 4 are designed to have shapes particularly suitable for the member collision test of the center pillar 1 and the side sill 2, as an example of this embodiment. The member collision test device, method and program of the present invention are not limited to the collision performance evaluation of the center pillar and the side sill, but may be applied to other kinds of members.

The support jig 10 includes a basic frame (a horizontal base 11, a vertical base 12 and an inclined beam 13), and a plurality of support points 16 and 24 mounted to the basic frame. The support jig 10 movably supports the member by each support point. The supporting aspect at each support point will be a part of boundary conditions given to the member in the partial collision simulation. The supporting aspect of each support point is determined by combining a degree of rotational freedom and a degree of translational freedom, and a rotational deformation resistance and a translational deformation resistance corresponding thereto, as described later. Each support point is mounted to the basic frame through a single or a plurality of movable support portions and a single or a plurality of resistance applying portions. As a result, each support point supports the member with a specific degree of deformation freedom and a specific deformation resistance. The parts used as the movable support portion may be, for example, a cylinder 25, a swing arm 21, a slider, a rotary shaft 20, or the like. The parts used as the resistance applying portion may be a weight or flywheel with an inertial resistance (a rotational deformation resistance), a hydraulic cylinder or air cylinder with a viscosity resistance, a metal spring with a spring resistance, a brake with a frictional resistance, a resistor material with a plastic deformation resistance (a bending deformation resistance), or the like. In addition, an inertial resistance may also be applied by adjusting the weight or moment of the movable support portion. The resistance characteristics (viscosity resistance, spring resistance, frictional resistance, and plastic deformation resistance) of each part which will constitute the movable support portion and the resistance applying portion are acquired from specification of the parts or actual measurement values, and are reproduced on the CAE simulation. The resistance value of each resistance applying portion may vary within a range satisfying the reproducibility of physical equipment. In this variable range, the resistance values are set to be suitable values or ranges on the CAE model, so that the deformation characteristics of the member on the partial collision CAE model are matched with the deformation characteristics of the member in the full vehicle state.

When the structure of the support jig is determined, the number of necessary support points and the location of each point in the of support jig are set in consideration of the connection aspect between the member to be evaluated and other members, the collision pattern or the like. Accordingly, a combination of the movable support portions and the resistance applying portions to be used for the support point is set. During those settings, parts are combined so that the entirety of the support jig and the load applying device may be actually build and sufficiently endure the load of the collision test to ensure sufficient safety at the test. As described above, the movable support portion and the resistance applying portion are set for all support points. In addition, in order to simulate the impact of the collision applied to the member, weight, initial collision speed, shape of a colliding portion, a colliding direction or the like of the load applying device 30 are provisionally designed. In addition, a composite body (module) including three elements, namely the support jig combined with the member, the member supported by the support jig, and the load applying device, is modeled into CAE. In this state, an initial shape of the partial structure CAE model is drawn up. At this time, a boundary condition that is given by each support point to the member is temporarily determined.

As the load applying device, a impacting carriage (an impactor) striking outward due to a high-output hydraulic cylinder or a device obtaining speed and energy through a gravity drop may be used. The load applying device 30 shown in FIG. 3 is a hydraulic cylinder type impactor carriage.

Next, a member collision simulation is performed using the drawn partial structure CAE model. In the member collision simulation, the load applying device 30 of the CAE model is operated to collide with the member. Through this simulation, the deformation characteristic of the member may be quantitatively measured based on an evaluation index (a collision performance evaluation parameter), described later, and it is compared with a value of the evaluation index in the full vehicle collision simulation. According to the comparison result, the configuration of the member collision test device is further adjusted so that the difference in the corresponding evaluation index values between the member simulation and the full vehicle simulation decreases as small as possible. As adjusting methods, the movable support portion and the resistance applying portion may be added, removed or substituted, and the resistance value given by each resistance applying portion may be adjusted again.

In the simulation using the partial structure CAE model, the deformation characteristics of the member by the member collision test device is obtained. A boundary condition of the member collision test device in the partial structure CAE model is determined so that this deformation characteristics satisfies a predetermined condition in view of the simulation result in full vehicle CAE model. In order to quantitatively evaluate the degree of agreement of the deformation characteristics, one or more representative evaluation indexes (collision performance evaluation parameters) of the deformation characteristics of the member are selected, and values of such evaluation indexes are calculated on each conduct of the simulation (a calculation process A). The calculated value of the evaluation index is stored in the system (a storing process B).

As the evaluation indexes of the deformation characteristics, for example, one or more indexes suitably selected from distribution of the deformation mode (associated mainly with plasticity of a part), deformation amount (associated mainly with part strength and impact intensity), a sectional force at a specific location, a deformation velocity (associated mainly with part strength and impact intensity), deformation energy (associated mainly with impact intensity and plastic deformation) or the like may be used. The adjustment on the CAE of the member collision test device and the member collision simulation are repeated so that the full vehicle collision simulation and the member collision simulation provide those index values in agreement with as much accuracy as possible (a calculation process C).

In addition, deformation mode, deformation amount, deformation velocity, deformation energy or the like of the member in the full vehicle collision test may be acquired by analyzing the full vehicle information acquired by the system. By comparing the results of the full vehicle collision simulation and the member collision simulation, when the values of all indexes of the deformation characteristics match within a predetermined allowable deviation, the adjustment of the partial structure CAE model is completed. The system may automatically repeat the simulation until predetermined indexes match, while the adjustment may be conducted by testing different combinations of parts and resistance values in each loop. Alternatively, an engineer may manually change the model under the assist of the system.

Through the above-explained process, the boundary condition of the partial structure CAE model may be determined so that the deformation characteristics of the member by the collision test device on the partial collision CAE model agrees with the deformation characteristics of the collision test on the full vehicle CAE model, and the boundary condition is stored in the system (a storing process D).

The boundary condition stored in the system is used as a test condition of the member collision test device when an real collision test is performed later.

A following member shape optimizing process is executed as necessary. By using the partial structure CAE model stored in the storing process D, a member shape is improved and optimized. At the optimization, the member may be improved not only from the viewpoint of the deformation characteristics during a collision but also from the viewpoint of weight lightening and cost reduction. In particular, on the partial structure CAE model, the shape of the member is changed while the setting of the member collision test device is left unchanged. With the member having a different shape, a CAE part collision simulation is performed to obtain a collision performance evaluation parameter, and the shape of the member is determined so that a value of this collision performance evaluation parameter satisfies a predetermined target value. For the shape of the member determined as described above, the model ensures that the part can be loaded on an actual vehicle, and in the same time, the part is optimized from the viewpoint of weight and cost.

Next, a member collision test process by physical instances of the equipments will be described. In this process, a collision test is performed on the member by using a member collision test device with the same operation as the member collision test device in the partial structure CAE model determined as explained above. The member collision test device includes a plurality of support points supporting the member; a movable support portion endowing at least one of a degree of rotational freedom and a degree of translational freedom to the member; a resistance applying portion endowing at least one of a rotational deformation resistance and a translational deformation resistance to a physical instance of member; and a load applying device pressing the physical instance of member. As the setting of the member collision test device, support points determined by the partial structure CAE model are mounted to a basic frame of the physical actual equipment by the movable support portion and the resistance applying portion. In a case where a resistance value of the resistance applying portion such as a brake pressure is variable, this variable resistance value is also set based on the analysis result using the partial structure CAE model. Simultaneously, the configuration and setting of the load applying device 30 are also set based on the analysis result by the partial structure CAE model. Specifically, for example, location and striking direction of the impactor carriage with respect to the member are adjusted to match with the state in the partial structure CAE model. In addition, a pressure of an launching hydraulic cylinder of the impactor carriage is suitably set so that the initial speed of the impactor may be reproduced as identical to the simulation on the CAE model.

In the setting of the physical instance of the collision test device, when each support point of the physical instance of the member collision test device supports the member, it is required to match the supporting aspect, such as rotational resistance and translational resistance applied to the member, with the conditions determined on the partial structure CAE model. Based on the boundary condition in the partial structure CAE model stored in the storing process D, the test condition of the member collision test device is determined (a calculation process E). The member collision test device on the partial collision CAE model and the physical member collision test device basically have the same specification, and therefore the boundary condition determined in the partial collision CAE model may be used as it is as a test condition of the physical member collision test device. However, in a case where the boundary condition is used as it is as the test condition, due to the physical constitution of the testing device, the ability of the member test device confirmed in the partial structure CAE model may not be exhibited. In such cases, the test condition of the member collision test device may be adjusted so that the collision test device exhibits desired ability. The test condition of the member collision test device determined by the calculation process E includes at least one of a degree of rotational freedom, a degree of translational freedom, a deformation resistance, and a rotational deformation resistance, at each support point of the member.

The determined test condition is stored in the system (a storing process F).

As described above, the member is supported by the member collision test device in which the conditions of the support points are adjusted, and the collision test is actually performed on the physical instance of the member. The test condition of the member collision test device obtained from the analysis results using the partial structure CAE model is stored in the storing process F, and the collision test of the member is performed by the member collision test device based on the information (a test process G). By doing so, the collision performance of the member may be evaluated with the reliability comparable to the collision test in the full vehicle state of the prototype vehicle.

As described above, according to the present invention, since the collision performance of a vehicle part may be evaluated with high reliability, comparable to the collision test in the full vehicle state of the prototype vehicle, a dramatically large number of collision tests can be performed at a low price. As a result, it is possible to prevent the unexpected increase of development costs or processes at a final stage.

In addition, a computer program for implementing the functions of the collision performance evaluation method of a vehicle part according to each embodiment of the present invention may be created. The program may be recorded on a computer-readable recording medium. Each function may be performed by executing the program in a computer system.

In addition, the computer system includes an operating system or hardware required for execution. In addition, the recording medium includes a magnetic disk, a hard disk, a magneto-optical disc, CD-ROM, or the like.

EXAMPLE

Hereinafter, an example of the method according to an embodiment of the present invention will be described. In this example, the deformation of the center pillar 1 and the side sill 2 in a side collision was analyzed. A partial structure CAE model suitable to the analysis was build and adjusted, and the simulation of the member collision test and the member collision test device as a physical equipment were performed.

Figure 5:
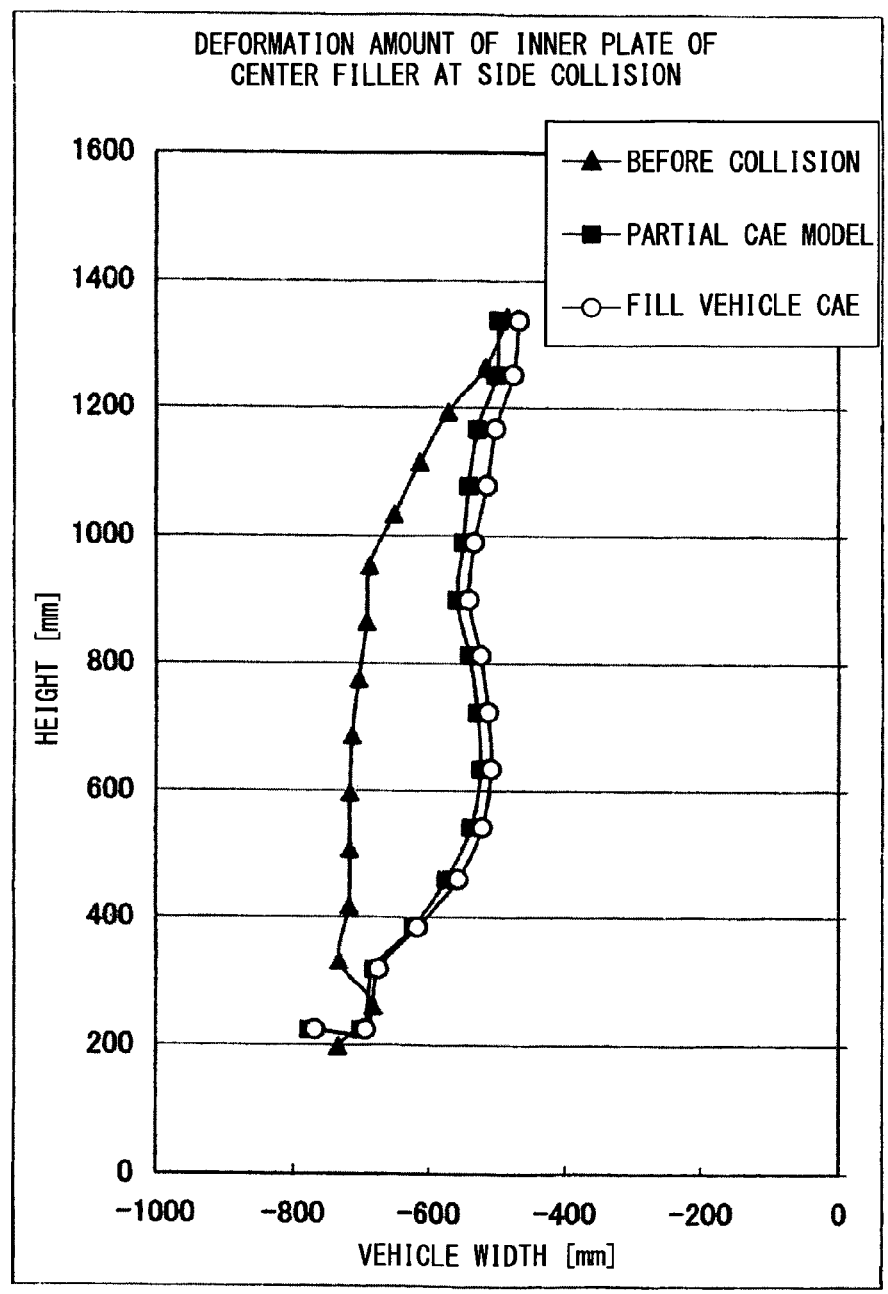
FIG. 5 is a graph showing a matching result of a boundary condition by a partial structure model CAE analysis.

As the full vehicle information, the result of an existing full vehicle CAE simulation was acquired to analyze deformation characteristics of the center pillar 1 and the side sill 2 during a collision. As indexes of the deformation characteristics of the center pillar 1 used for determining a boundary condition, a maximum deformation amount L along the colliding direction of the center pillar and a profile of the entire center pillar deformed were used. The profiles of the center pillar before and after the full vehicle collision test are shown in FIG. 5. As a result of the analysis of the profiles, the maximum deformation amount L of the center pillar before and after the full vehicle CAE simulation was 234 mm.

By using the evaluation index, the member collision test device was designed on the partial structure CAE model. The basic frame of the support jig 10 includes the horizontal base 11 and the vertical base 12 formed at the rear portion of the horizontal base 11, and the inclined beam 13 is disposed between them to endure a load of the collision test. Three support points supporting the composite body of the center pillar 1 and the side sill 2 are provided in total, one to the upper portion of the center pillar 1 and two to the right and left of the lower side sill 2, and a rotation bearing 14 serving as the movable support portion, a flywheel 17 serving as the resistance applying portion simulating the rotational deformation resistance, or the like are respectively arranged on the CAE model at each support point.

Here, for example, if the flywheel 17 used has a great inertial moment, the rotational deformation resistance of the lower support point 16 increases during the collision test, and if the flywheel 17 used has a small inertial moment, the rotational deformation resistance of the lower support point 16 decreases. The inertial moment of the flywheel 17 was adjusted so that the deformation of a selected part at the full vehicle collision is most appropriately simulated. In addition, even though it is determined as optimal in this example to use only the flywheel 17 in order to simulate the rotational deformation resistance of the support point 16 as described above, it is also possible in some cases that a brake be arranged accessorily or that a stopper for blocking deformation over a predetermined level be combined to have a more suitable boundary condition.

On the partial structure CAE, the following movable support portion was further designed. In consideration of the vertical deformation amount of the center pillar 1 after the full vehicle collision, a swing arm 21 (a movable support portion) which is movable with a shaft 20 as a pivot as shown in FIG. 4 was disposed at the upper end portion of the vertical base 12. A rotary shaft 23 having a flywheel 22 (resistance applying portion) for simulating the rotational deformation resistance was disposed at the front end portion of the swing arm 21, similar to the lower portion. The upper end portion of the center pillar 1 was fixed to the center portion of the rotary shaft 23. The rotary shaft 23 and the flywheel 22 configure the upper support point 24. Further, a cylinder 25 extending in an inclined upper direction from the horizontal base 11 is disposed at the swing arm 21 on the CAE model. This structure simulates a bending deformation resistance or the like applied from the vehicle body at the full vehicle collision test when buckling occurs at the center pillar. In the full vehicle state, since the upper end portion of the center pillar 1 is supported by a ceiling structure which may be easily deformed in comparison to the lower side sill 2, from the viewpoint of the design of the support jig, the combination of the swing arm 21 and the rotary shaft 23 was adopted. In this design, it is possible to adjust the degree of rotational freedom and its rotational deformation resistance with regard to the lower support point 16, and the degree of rotational freedom and its rotational deformation resistance and the degree of translational freedom and its deformation resistance with regard to the upper support point 24. In addition, the load applying device 30 on the partial structure CAE model is disposed with the location and angle by which the same load as the side collision is applied to the center pillar 1 supported by the support jig.

Regarding the collision simulation of the partial structure CAE model, the impactor was set to have a mass of 350 kg and an launching speed of 20 km/h. While adjusting the weight of the flywheel of each support point, the simulation was repeatedly performed.

In the front half of the partial collision simulation, the flywheels 17 and 22 rotated in a consistent direction, but the reserved rotating energy further distorts the side sill even after the termination time of the collision phenomenon, thereby increasing the overall deformation. As a result, a gap from the full vehicle CAE result increased. Therefore, the CAE model was adjusted so that the rotational resistance only in a specific direction is transferred from the flywheel to the rotary shaft. In the physical equipment, the test condition equivalent to this model may be realized by installing a one-way clutch between the rotary shaft and the flywheel.

The result of the partial structure collision simulation using the partial structure CAE model completely adjusted by the method of this embodiment is shown in FIG. 5.

As a result of the adjustment of each component of the support jig, such as the moment of the flywheel or the like, as shown in FIG. 5, the maximum deformation amount L of the center pillar after the simulation becomes 226 mm, which is within the range of the target deviation. In addition, the profile of the entire center pillar matched to the full vehicle state with good accuracy, and therefore the adjustment of the CAE model is completed at this stage.

Figure 6:
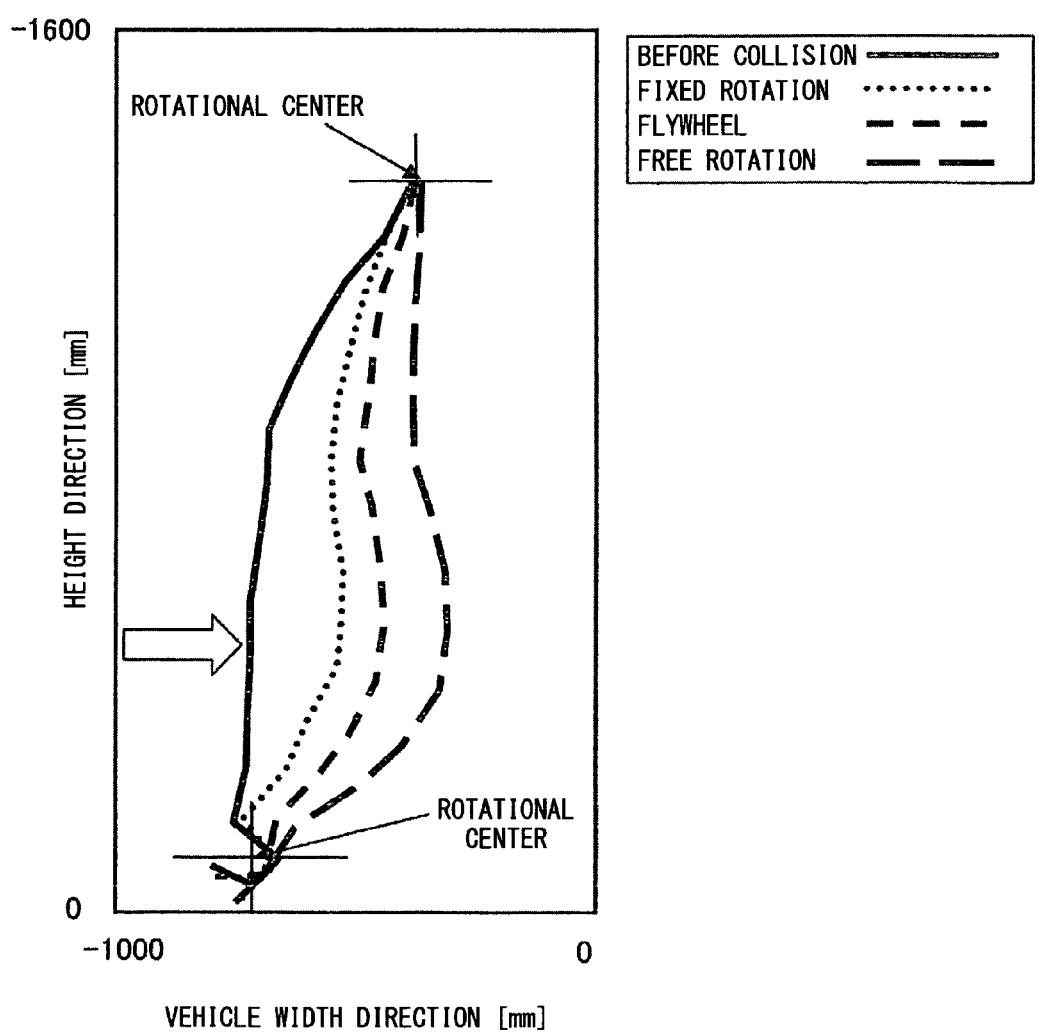
FIG. 6 is a simulation result of a partial structure collision using three different kinds of conditions, as the boundary condition of a support portion of the member collision test device.

FIG. 6 is a partial structure CAE simulation result clearly showing an aspect where the displacement of the center pillar at a collision is influenced by whether the boundary condition of the support portion of the member collision test device is matched. In this test, using the partial structure CAE model completely adjusted as explained above, only the rotational moment of each flywheel is set to be a variable parameter, and three kinds of values are given to the parameter to perform the collision simulation. As described above, the support jig has 3 support points, each supporting the center pillar through the flywheel. The rotation moments of these flywheels are variable parameters. In the figure, the arrow represents location and direction of the added load.

(Condition 1: Fixed Rotation) In this condition, the flywheel comes to a fixed state so as not to rotate at 3 support points.

(Condition 2: Flywheel) In this condition, at 3 support points, each flywheel has a rotational moment determined by adjustment, and rotation is allowed in a plane parallel to the printed face of FIG. 6. The moment amount of each flywheel is set to most approximately match the full vehicle collision state. This Condition 2 is identical to the condition of the partial structure CAE model after the boundary condition is determined in FIG. 5.

(Condition 3: Rotational Freedom) In this condition, the rotational moment of each flywheel around the hub bolt is 0. The center pillar may freely rotate at 3 support points with respect to the jig.

FIG. 6 shows the profile of the center pillar before the collision and the shape of the center pillar after the collision obtained by the partial structure CAE analysis using the above shown three conditions. The profile of the center pillar and the impact applied by the collision are identical to those of the simulation of FIG. 5. Obviously, it is the result of Condition 2 (Flywheel) that matches most appropriately with the result the full vehicle CAE analysis shown in FIG. 5.

Meanwhile, in Condition 1 (Fixed Rotation), compared with the full vehicle CAE analysis result, the displacement after the collision is calculated to be lower by 32% at maximum in the vehicle width direction. This result shows that the displacement amount is estimated drastically lower if an experiment is performed using a jig whose rotation at the support portion is completely restrained.

In addition, in Condition 3 (Rotational Freedom), compared with the full vehicle CAE analysis result, the displacement after the collision is calculated excessively by about 51% at maximum in the vehicle width direction. This Condition 3 is modeled after an experiment where the rotational resistance applied by the vehicle body to the center pillar is neglected. For example, in a common 3-point bending test, since the rotation of a part to be tested at each support portion is not regulated, its result is expected to be closer to the result of this Condition 3.

From the above result, it is obvious that the rotational resistance applied to the center pillar from the vehicle body gives an important influence on the center pillar displacement after the collision. In the test using the support jig according to this embodiment, by performing the member collision test device which simulates a suitable rotational resistance by using a flywheel, the accuracy of the test result may be dramatically improved, compared with a member collision test using a conventional 3-point bending method or a perfectly fixed jig.

Next, the support point was mounted to a physical support jig.

As each resistance applying portion of the physical equipment, the flywheel 17 for the lower support point 16 had a substantially disk shape with a diameter of 500 mm and a thickness of 100 mm and has a weight of about 154 kg. The flywheel 22 for the upper support point 24 had a substantially disk shape with a diameter of 500 mm and a thickness of 35 mm and has a weight of about 54 kg. One-way clutches were mounted to the bearings of both flywheels 17 and 22, and they were set to a direction so as to freely revolve in the latter half of the experiment. The translational resistance of the cylinder 25 was set to be 5000 kgf (49 kN).

A launching device was set so that the impactor had a mass of 350 kg and an initial launching velocity of 20 km/h identical to that on the CAE simulation.

Test 1

According to the above conditions, a member collision test was conducted using a physical instance of the member of the center pillar. A substantial difference was found between a deformation profile of the physical center pillar and a deformation profile on the CAE simulation. The center portion of the difference was observed on the physical center pillar after the test was conducted, and a spot fracture was found on the center pillar in the center portion in the longitudinal direction. On the CAE simulation, the fracture was not reproduced in either of the collision simulation of the full vehicle CAE model or in the collision simulation of the partial collision CAE model.

Test 2

Therefore, a reinforcing bead was applied by TIG welding to a location of a separately prepared new center pillar at the position corresponding to the fracture. In addition, by using the center pillar after the TIG welding, the member collision test was conducted again on the physical equipment. As a result, in the center pillar after the TIG welding, a spot fracture was not observed in either of the TIG welding portion or the other portions.

Three center pillars after the TIG welding reinforcement were additionally manufactured, and the physical equipment member collision tests were conducted three times using the center pillars. As a result, the maximum deformation amount L of the physical center pillar was 237 mm on average of three tests. The profile of the center pillar after the deformation also coincided with the collision test result on the CAE of the full vehicle and on the CAE of the selected member, with high accuracy. In any of the three tests, spot fracture was not observed, and in the three tests, the profiles of the center pillar were substantially coincided from each other. For this reason, it can be understood that the test using the physical equipment of the member collision test device has high reproducibility.

As described above, as an example of the method of the present invention, the partial collision CAE model was drawn up, a boundary condition on the CAE was determined, and then the member collision test was conducted by reproducing the boundary condition. As a result, for each deformation evaluation index, it is possible to reproduce the result of the full vehicle CAE simulation with high accuracy.

In addition, the spot fracture phenomenon at the collision, which did not occur in the CAE simulation of the full vehicle and member collision, was generated when the physical member collision test was used. In other words, latent problems of the member, which were not revealed on the full vehicle CAE simulation and on the member collision CAE simulation, could be revealed by conducting the partial structural collision test.

In order to avoid the fracture, the physical center pillar was reinforced by TIG welding. In this case, the deformation characteristic of the center pillar on the partial collision CAE simulation coincided with the deformation characteristic on the partial collision test using the physical part after reinforcement.

Through the above-shown example, according to this embodiment, it could be understood that the fracture phenomenon or the like, which was not easily reproduced on preexisting CAE models, may be easily reproduced on physical equipments.

INDUSTRIAL APPLICABILITY

In the collision performance evaluation of the present invention, since the collision simulation is performed using the partial structure CAE model using the deformation characteristics of the member as an index, it may be ensured that the boundary condition of the partial structure CAE model exactly reflects the dynamic influence applied from other members during a collision, in the full vehicle CAE model. Therefore, even though a partial structure CAE model with a small calculation load is used, the collision performance of the member may be evaluated substantially in the same precision as the full vehicle CAE or the full vehicle collision test. Therefore, it is possible to suppress the increase of development costs or processes.

REFERENCE SIGNS LIST

1: CENTER PILLAR
2: SIDE SILL
10: BODY
11: HORIZONTAL BASE
12: VERTICAL BASE
13: INCLINED BEAM
14: BEARING
16: LOWER SUPPORT PORTION
17: FLYWHEEL
20: SHAFT
21: SWING ARM
22: FLYWHEEL
23: ROTARY SHAFT
24: UPPER SUPPORT PORTION
25: CYLINDER
30: LOAD APPLYING DEVICE

The invention claimed is:

1. A performance evaluation method of a vehicle member, comprising:
    an information acquiring process which acquires full vehicle information calculated by a full vehicle CAE model;
    a member selecting process which selects a vehicle member to be evaluated based on the full vehicle information that has been acquired;
    a CAE model design process which designs a partial structure CAE model consisting of the vehicle member that has been selected;
    a first calculation process which calculates a collision performance evaluation parameter based on the partial structure CAE model that has been designed;
    a first storing process which stores the value of the collision performance evaluation parameter that has been calculated in the first calculation process;
    a second calculation process which calculates the collision performance evaluation parameter based on the full vehicle CAE model;
    a second storing process which stores the value of the collision performance evaluation parameter that has been calculated in the second calculation process;
    a boundary condition adjusting process which adjusts a boundary condition of the partial structure CAE model so that a deviation between the collision performance evaluation parameter calculated in the first calculation process and the collision performance evaluation parameter calculated in the second calculation process is not more than a predetermined value;
    a third storing process which stores the boundary condition of the partial structure CAE model that has been obtained in the boundary condition adjusting process;
    a boundary condition determining process which determines a boundary condition of a partial structure collision test device based on the boundary condition of the partial structure CAE model stored in the third storing process;
    a fourth storing process which stores the boundary condition of the partial structure collision test device that has been determined in the boundary condition determining process; and
    a test process which conducts a collision test using a physical instance of the partial structure collision test device and a physical instance of the member, based on the boundary condition of the partial structure collision test device stored in the fourth storing process.

2. The performance evaluation method of a vehicle member according to claim 1, wherein the vehicle member to be evaluated is selected using at least one of a analysis result using the full vehicle CAE model and a test result of a full vehicle collision test.

3. The performance evaluation method of a vehicle member according to claim 1,
    wherein, in the calculation process, the collision performance evaluation parameter is calculated by the partial structure CAE model with respect to a vehicle member having a shape different from the vehicle member to be evaluated, by using the boundary condition of the partial structure CAE model already stored in the second storing process, and the shape of the vehicle member where the collision performance evaluation parameter satisfies a predetermined condition is determined, and
    wherein, for the vehicle member having the determined shape, a collision test using the partial structure collision test device is performed based on the boundary condition stored in the third storing process.

4. The performance evaluation method of a vehicle member according to claim 1, wherein the performance evaluation parameter of the partial structure CAE model calculated in the calculation process includes at least one of a deformation mode, a deformation amount, a deformation velocity and a deformation energy.

5. The performance evaluation method of a vehicle member according to claim 1,
    wherein the partial structure collision test device supports the vehicle member at a single support point or at a plurality of support points, and wherein the boundary condition of the partial structure collision test device determined by the boundary condition determining process includes at least one of a degree of rotational freedom, a degree of translational freedom, a deformation resistance and a rotational deformation resistance at each support point of the partial structure.

6. A collision test device used in collision performance evaluation of a vehicle member, comprising:
a single or a plurality of support points which supports a physical member to be tested;
a movable support portion which applies at least one of a degree of rotational freedom and a degree of translational freedom to the physical member;
a resistance applying portion which applies at least one of a rotational deformation resistance and a translational deformation resistance to the physical member; and
a load applying device pressing the physical member,
wherein the collision test device is configured to determine a supporting aspect of the physical member at each of the support points based on a boundary condition of a partial structure CAE model, the boundary condition of the partial structure CAE model being obtained by following steps of:
an information acquiring process which acquires full vehicle information calculated by a full vehicle CAE model;
a member selecting process which selects a vehicle member and a collision performance evaluation parameter to be evaluated based on the full vehicle information that has been acquired;
a CAE model design process which designs a partial structure CAE model consisting of the vehicle member that has been selected;
a first calculation process which calculates a collision performance evaluation parameter based on the partial structure CAE model that has been designed;
a first storing process which stores the value of the collision performance evaluation parameter that has been calculated in the first calculation process;
a second calculation process which calculates the collision performance evaluation parameter based on the full vehicle CAE model;
a second storing process which stores the value of the collision performance evaluation parameter that has been calculated in the second calculation process;
a boundary condition adjusting process which adjusts a boundary condition of the partial structure CAE model so that a deviation between the collision performance evaluation parameter calculated in the first calculation process and the collision performance evaluation parameter calculated in the second calculation process is not more than a predetermined value.

7. The collision test device according to claim 6, wherein the movable support portion includes a rotary shaft, and
wherein the resistance applying portion includes a flywheel connected to the rotary shaft.

8. The collision test device according to claim 7, wherein the rotary shaft includes a one-way clutch.

9. The performance evaluation method of a vehicle member according to claim 1, wherein the collision test device used in the test process comprises:
a single or a plurality of support points which supports a physical member to be tested;
a movable support portion which applies at least one of a degree of rotational freedom and a degree of translational freedom to the physical member;
a resistance applying portion which applies at least one of a rotational deformation resistance and a translational deformation resistance to the physical member; and
a load applying device pressing the physical member.

10. The collision test device according to claim 6, further comprising:
a basic frame including a horizontal base, a vertical base, and an inclined beam,
wherein the single or the plurality of support points are mounted to the basic frame.

11. The performance evaluation method of a vehicle member according to claim 1, wherein the boundary condition includes a determination of a maximum deformation of the member and a profile of the member.

12. The collision test device according to claim 6, wherein the boundary condition includes a determination of a maximum deformation of the member and a profile of the member.

* * * * *